United States Patent
Ahmed

(10) Patent No.: US 12,330,137 B1
(45) Date of Patent: Jun. 17, 2025

(54) METHOD OF PRODUCING A MESOPOROUS CHITOSAN/NaFeSi$_2$O$_6$ BASED NANOCOMPOSITE

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

(*) Notice: Subject to any disclaimer, the term of this patent is extended or adjusted under 35 U.S.C. 154(b) by 0 days.

(21) Appl. No.: 18/925,910

(22) Filed: Oct. 24, 2024

(51) Int. Cl.
*B01J 20/24* (2006.01)
*B01J 20/10* (2006.01)
(Continued)

(52) U.S. Cl.
CPC ............ *B01J 20/24* (2013.01); *B01J 20/10* (2013.01); *B01J 20/28016* (2013.01);
(Continued)

(58) Field of Classification Search
CPC ...... B01J 20/24; B01J 20/10; B01J 20/28016; B01J 20/28059; B01J 20/28071;
(Continued)

(56) References Cited

FOREIGN PATENT DOCUMENTS

CN 109046265 A 12/2018
CN 113058606 A * 7/2021
(Continued)

OTHER PUBLICATIONS

Mingyan Chen, et al., "Investigation on preparation of carboxymethyl chitosan modified sodium ferric silicate and its adsorption properties", Journal of Vinyl & Additive Technology, vol. 27, issue 4. Nov. 2021(14 pages).

(Continued)

*Primary Examiner* — Anthony J Zimmer
*Assistant Examiner* — Starfari Teshawn McClain
(74) *Attorney, Agent, or Firm* — Oblon, McClelland, Maier & Neustadt, L.L.P.

(57) ABSTRACT

A method of producing a mesoporous chitosan/sodium iron silicate (NaFeSi$_2$O$_6$) nanocomposite includes hydrothermally treating a mixture of sodium metasilicate pentahydrate (Na$_2$SiO$_3$·5H$_2$O) with iron(III) chloride hexahydrate (FeCl$_3$·6H$_2$O) to obtain NaFeSi$_2$O$_6$ nanoparticles. The method further includes combining the NaFeSi$_2$O$_6$ nanoparticles with a solution of chitosan to generate a precursor mixture; treating the precursor mixture with sodium hydroxide (NaOH), resulting in a nanocomposite where chitosan coats and aggregates the NaFeSi$_2$O$_6$ nanoparticles into rod-like structures. The resulting nanocomposite exhibits unique textural properties with mesopores larger than 15 nm, is ideal for adsorption, separation, and catalysis, and can be produced under mild conditions without complex procedures or hazardous chemicals.

20 Claims, 5 Drawing Sheets

(51) Int. Cl.
  *B01J 20/28* (2006.01)
  *B01J 20/30* (2006.01)
  *B01J 20/32* (2006.01)
  *C01B 33/32* (2006.01)

(52) U.S. Cl.
  CPC ... *B01J 20/28059* (2013.01); *B01J 20/28071* (2013.01); *B01J 20/28083* (2013.01); *B01J 20/3085* (2013.01); *B01J 20/3204* (2013.01); *B01J 20/3274* (2013.01); *B01J 20/3291* (2013.01); *C01B 33/32* (2013.01); *C01P 2002/72* (2013.01)

(58) Field of Classification Search
  CPC .............. B01J 20/28083; B01J 20/3085; B01J 20/3204; B01J 20/3274; B01J 20/3291; C01B 33/32; C01P 2002/72
  See application file for complete search history.

(56) References Cited

FOREIGN PATENT DOCUMENTS

| | | |
|---|---|---|
| CN | 108584968 B | 10/2021 |
| CN | 114700045 A | 7/2022 |
| CN | 115106064 A | 9/2022 |

OTHER PUBLICATIONS

Yin Ai-Ping et al., "Flocculation effect of carboxymethyl chitosan composite flocculant on hexavalent chromium in electroplating wastewater", Electroplating & Finishing, vol. 42, Issue 8. Aug. 2013 (3 pages).

* cited by examiner

METHOD OF PRODUCING A MESOPOROUS CHITOSAN/NaFeSi$_2$O$_6$ BASED NANOCOMPOSITE

BACKGROUND

Technical Field

The present disclosure is directed to a method for producing a nanocomposite, and particularly a method for synthesizing a mesoporous chitosan/NaFeSi$_2$O$_6$ nanocomposite using chitosan and NaFeSi$_2$O$_6$ nanoparticles.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Green polymeric nanocomposites are designed to improve properties like thermal stability, strength, and biodegradability, all while being environmentally friendly. By integrating natural or biodegradable polymers with nanoparticles like clay, silica, or carbon-based materials, these materials achieve enhanced performance. They are particularly well-suited for uses in packaging, biomedical devices, and water purification, making them a valuable option for sustainable material solutions in many industries.

Nanocomposites are high-performance materials with unique property combinations, driven by the large surface area of nanoparticles and strong interfacial bonding with polymers. This interfacial strength allows for the transferring of the nanoparticles' excellent properties to the composite, enhancing toughness, tensile strength, and elasticity. With a rapid growth rate of 25%, nanocomposites are increasingly in demand for applications in engineering plastics, elastomers, and sectors like packaging, aerospace, and biomedical fields. Environmentally friendly options, including clay-based minerals and natural fibers, offer exciting opportunities, paving the way for innovation in industries such as aerospace, electronics, and biotechnology [Pedro Henrique et al., *Mat. Res.*, 2009, 12 (1)].

Despite the numerous advantages of nanocomposites, several drawbacks need to be addressed to enhance their performance and broaden their applicability. One major challenge is achieving uniform dispersion of nanoparticles within the matrix, as agglomeration can reduce the material's effectiveness, impacting properties like strength, conductivity, and thermal stability. To overcome this, nanocomposites must be altered to improve dispersion, tailor surface area and pore size for specific applications, and enhance long-term stability. Additionally, reducing production costs and ensuring safety and environmental sustainability will contribute to broader industrial use. Therefore, several research articles and patents focusing on the synthesis and application of chitosan-based nanocomposites, exploring their biocompatibility, biodegradability, and use in fields such as drug delivery, water treatment, and antimicrobial applications.

Chitosan derivative nanocomposites have earned high interest due to their distinctive physical and chemical properties and use as a pure biomaterial. Chitosan's properties can be enhanced through nanotechnology by integrating various nanostructures. While chitosan alone may suffer from issues like poor mechanical strength, low thermal stability, and inadequate barrier properties, incorporating nanoscale inorganic and organic compounds can address these drawbacks. Nanostructures, including nanoparticles, nanosheets, nanorods, nano capsules, nanowires, and nanofibers, can be embedded within the chitosan matrix or applied as surface coatings to improve its overall performance. These advancements allow chitosan to benefit from enhanced strength, thermal stability, and barrier properties, expanding its utility in various applications. Chitosan has been widely utilized in adsorption technologies due to its ability to bind heavy metals and organic pollutants, making it a valuable material for environmental remediation.

Chitosan, in particular, has been widely utilized in adsorption technologies due to its ability to bind heavy metals and organic pollutants, making it a valuable material for environmental remediation [Duarte Moura et. al, *Sci Technol Adv Mater.*, 2016, 17(1), 626-643]. Recent advancements have focused on integrating chitosan with nanoparticles, using techniques like 3D printing and electrospinning, to enhance its performance. This approach is expanding chitosan's applications in fields such as medicine, tissue engineering, wastewater treatment, and corrosion inhibition. However, research gaps remain in understanding chitosan's interactions with nanomaterials and exploring future possibilities for its use. Previous patents and research articles have primarily emphasized either the complex synthesis of similar nanocomposites or their applications in areas like environmental remediation, where adsorption properties are useful.

Accordingly, one object of the present disclosure is to develop chitosan-based nanocomposites by combining chitosan with nanoscale additives such as nanoparticles, nanofillers and nanofibers to enhance its properties. By investigating their potential applications, the goal is to address and overcome the existing limitations of current technologies.

SUMMARY

In an exemplary embodiment, a method of producing a mesoporous chitosan/sodium iron silicate (NaFeSi$_2$O$_6$) nanocomposite is described. The method includes hydrothermally treating a mixture of sodium metasilicate pentahydrate (Na$_2$SiO$_3$·5H$_2$O) with iron(III) chloride hexahydrate (FeCl$_3$·6H$_2$O) to form NaFeSi$_2$O$_6$ nanoparticles. The method includes combining the NaFeSi$_2$O$_6$ nanoparticles with a solution containing chitosan to form a precursor. The method further includes treating the precursor mixture with sodium hydroxide (NaOH) to form a mesoporous chitosan/NaFeSi$_2$O$_6$ nanocomposite, where chitosan coats and aggregates the NaFeSi$_2$O$_6$ nanoparticles into rod-like structures. The surface area and pore size or volume measurement of prepared mesoporous chitosan/NaFeSi$_2$O$_6$ nanocomposite is measured using nitrogen adsorption-desorption analysis. The result obtained for the surface area shows a pore diameter greater than 15 nm.

In some embodiments, the mesoporous chitosan/NaFeSi$_2$O$_6$ nanocomposite has a mean pore diameter of greater than 25 nm as measured by nitrogen adsorption-desorption analysis.

In some embodiments, the mesoporous chitosan/NaFeSi$_2$O$_6$ nanocomposite has a mean pore diameter of greater than 35 nm as measured by nitrogen adsorption-desorption analysis.

In some embodiments, the mesoporous chitosan/ $NaFeSi_2O_6$ nanocomposite has a BET surface area of greater than 5 $m^2 \cdot g^{-1}$ as measured by nitrogen adsorption-desorption analysis.

In some embodiments, the mesoporous chitosan/ $NaFeSi_2O_6$ nanocomposite has a BET surface area of greater than 7 $m^2 \cdot g^{-1}$ as measured by nitrogen adsorption-desorption analysis.

In some embodiments, the mesoporous chitosan/ $NaFeSi_2O_6$ nanocomposite has a BET surface area of greater than 9 $m^2 \cdot g^{-1}$ as measured by nitrogen adsorption-desorption analysis.

In some embodiments, the mesoporous chitosan/ $NaFeSi_2O_6$ nanocomposite has a total pore volume of greater than 0.05 $cm^3 \cdot g^{-1}$ as measured by nitrogen adsorption-desorption analysis.

In some embodiments, the mesoporous chitosan/ $NaFeSi_2O_6$ nanocomposite has a total pore volume of greater than 0.07 $cm^3 \cdot g^{-1}$ as measured by nitrogen adsorption-desorption analysis.

In some embodiments, the mesoporous chitosan/ $NaFeSi_2O_6$ nanocomposite has a total pore volume of greater than 0.09 $cm^3 \cdot g^{-1}$ as measured by nitrogen adsorption-desorption analysis.

In some embodiments, the mesoporous chitosan/ $NaFeSi_2O_6$ nanocomposite exhibits a Type IV isotherm with an H3 hysteresis loop in a nitrogen adsorption-desorption isotherm as determined by nitrogen adsorption-desorption analysis.

In an exemplary embodiment, the method produces a nanocomposite including chitosan and $NaFeSi_2O_6$, where chitosan envelopes and aggregates the $NaFeSi_2O_6$ nanoparticles into rod-like structures, and the nanocomposite has a mean pore diameter greater than 15 nm, as measured by nitrogen adsorption-desorption analysis.

In some embodiments, the nanocomposite has a mean pore diameter of greater than 25 nm as measured by nitrogen adsorption-desorption analysis.

In some embodiments, the nanocomposite has a mean pore diameter of greater than 35 nm as measured by nitrogen adsorption-desorption analysis.

In some embodiments, the nanocomposite has a BET surface area of greater than 5 $m^2 \cdot g^{-1}$ as measured by nitrogen adsorption-desorption analysis.

In some embodiments, the nanocomposite has a BET surface area of greater than 7 $m^2 \cdot g^{-1}$ as measured by nitrogen adsorption-desorption analysis.

In some embodiments, the nanocomposite has a BET surface area of greater than 9 $m^2 \cdot g^{-1}$ as measured by nitrogen adsorption-desorption analysis.

In some embodiments, the nanocomposite has a total pore volume of greater than 0.05 $cm^3 \cdot g^{-1}$ as measured by nitrogen adsorption-desorption analysis.

In some embodiments, the nanocomposite has a total pore volume of greater than 0.05 $cm^3 \cdot g^{-1}$ as measured by nitrogen adsorption-desorption analysis.

In some embodiments, the nanocomposite has a total pore volume of greater than 0.09 $cm^3 \cdot g^{-1}$ as measured by nitrogen adsorption-desorption analysis.

In some embodiments, the nanocomposite exhibits a Type IV isotherm with an H3 hysteresis loop in a nitrogen adsorption-desorption isotherm as determined by nitrogen adsorption-desorption analysis.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
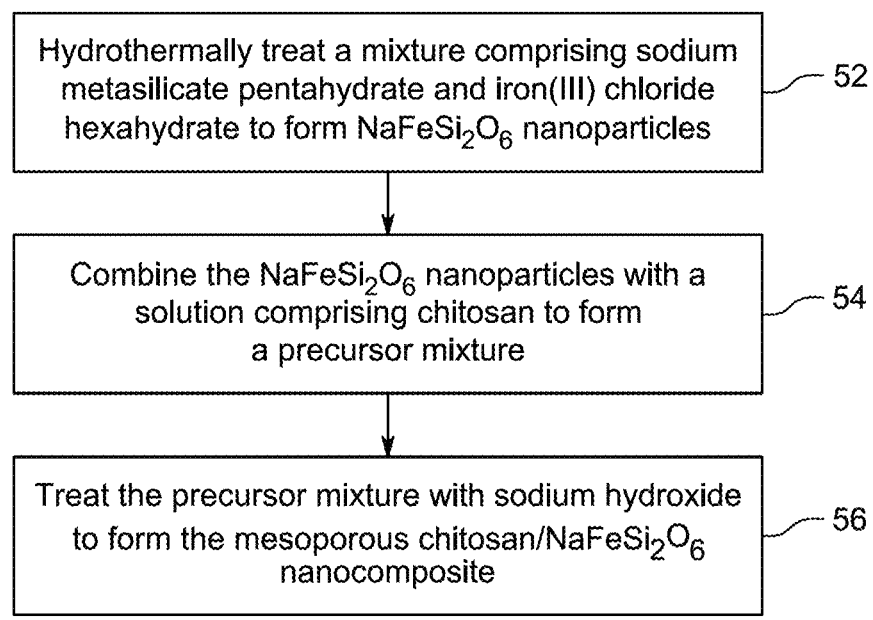
FIG. 1 is a schematic flow chart of a method of preparation of $NaFeSi_2O_6$ nanocomposite using chitosan, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Embodiments of the present disclosure will now be described more fully hereinafter with reference to the accompanying drawings, in which some, but not all embodiments of the disclosure are shown.

As used herein, the words "about," "approximately," or "substantially similar" may be used when describing magnitude and or position to indicate that the value and/or position described is within a reasonable range of values and/or positions. For example, a numeric value may have a value that is +/−0.1% of the stated value (or range of values), +/−1% of the slated value (or range of values), +/−2% of the stated value (or range of values), +/−5% of the slated value (or range of values), +/−10% of the staled value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, the terms 'nanocomposite' and 'nanoparticles' refer to materials that are engineered at the nanoscale, typically defined as having one or more dimensions in the range of 1 to 100 nanometers. Nanocomposites are hybrid materials composed of a matrix, often polymeric or ceramic, in which nanoparticles are incorporated to enhance specific properties such as strength, thermal stability, electrical conductivity, or bioactivity. These nanoparticles can be made from various substances, including metals, metal oxides, carbon-based materials, or polymers, and they are dispersed throughout the matrix to create a synergistic effect that improves overall performance compared to the individual components alone. The unique characteristics of nanocomposites, including their large surface area-to-volume ratio and enhanced reactivity, make them suitable for a wide range of applications in fields such as materials science, medicine, electronics, and environmental engineering.

As used herein, the term 'mesoporous' refers to materials characterized by pore sizes typically ranging from 2 to 50 nanometers in diameter. These mesopores provide surface area and volume within the material, facilitating enhanced adsorption and interaction with gases, liquids, or biomolecules. Mesoporous materials are often employed in applications such as catalysis, drug delivery, and environmental remediation due to their ability to accommodate larger molecules compared to microporous materials, which have smaller pore sizes. The unique structural properties of mesoporous materials enable tunable characteristics, making them valuable in various industrial and scientific fields.

As used herein, the term 'hydrothermal treatment' refers to a process that involves the application of high temperature and pressure in the presence of water or aqueous solutions to facilitate the synthesis or modification of materials. This method is commonly used to enhance crystallinity, promote phase transformations, or generate specific nanostructures in materials such as metal oxides, zeolites, and biomaterials. During hydrothermal treatment, the solvent acts as a medium for chemical reactions, enabling the dissolution and precipitation of compounds, which can lead to improved properties such as increased surface area, enhanced porosity, or tailored morphology. This technique is widely applied in various fields, including materials science, environmental engineering, and pharmaceuticals, due to its ability to produce high-quality materials with controlled characteristics.

As used herein, the term 'treatment' refers to the process designed to deliver high-efficiency solutions for transforming raw materials or compounds into desired forms.

As used herein, the term 'solution' refers to a mixture of two or more components wherein the mixture is homogeneous.

As used herein, 'particle size' and 'pore size' may be considered the lengths or longest dimensions of a particle and a pore opening, respectively.

As used herein, the term 'aggregates' refers to the clumping of individual nanoparticles into larger aggregates or clusters, a process that influences their physical and chemical properties. This phenomenon is driven by several factors, including high surface energy, van der Waals forces, and electrostatic interactions, as well as the properties of the surrounding solvent, such as pH and ionic strength. Higher concentrations of nanoparticles can also lead to increased interactions, promoting aggregation. While aggregation can enhance stability in some cases, it often results in performance degradation, reducing reactivity, surface area, and mechanical properties, which negatively impacts applications in fields like catalysis, drug delivery, and materials science.

Aspects of this disclosure are directed to a method of producing a mesoporous chitosan/$NaFeSi_2O_6$ nanocomposite. Mesoporous composite exhibits a more irregular and porous architecture, a characteristic feature arising from the combination of a biopolymer like chitosan with inorganic nanoparticles. The porosity of the composite facilitates greater surface area and enhanced accessibility for interactions with various substrates, making it ideal for applications such as adsorption and environmental remediation. This porous structure not only enhances surface interactions but also allows for improved transport of molecules, which beneficial for applications in drug delivery, adsorption and catalysis.

FIG. 1A illustrates a schematic flow chart of a method 50 of producing a mesoporous chitosan/$NaFeSi_2O_6$ nanocomposite. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes hydrothermally treating a mixture including sodium metasilicate pentahydrate and iron (III) chloride hexahydrate to form $NaFeSi_2O_6$ nanoparticles. In some embodiments, for the synthesis of $NaFeSi_2O_6$, the silicate source used may be Sodium Silicate, Sodium Disilicate ($Na_2Si_2O_5$), Sodium Orthosilicate ($Na_4SiO_4$), Sodium Silicate Decahydrate ($Na_2SiO_3 \cdot 10H_2O$), Sodium Metasilicate Nonahydrate ($Na_2SiO_3 \cdot 9H_2O$) and Sodium Silicate Hexahydrate ($Na_2SiO_3 \cdot 6H_2O$). In a preferred embodiment, the silicate source is sodium metasilicate pentahydrate ($Na_2SiO_3 \cdot 5H_2O$). In the hydrothermal synthesis of $NaFeSi_2O_6$, sodium metasilicate pentahydrate ($Na_2SiO_3 \cdot 5H_2O$) and iron (III) chloride hexahydrate ($FeCl_3 \cdot 6H_2O$) are the reactants that form the formation of the target compound. Sodium metasilicate serves as the silicon source, releasing silicate ions ($SiO_4$) upon dissolution in water, while also contributing sodium ions ($Na^+$) for the final composition of $NaFeSi_2O_6$. As the hydrothermal treatment progresses, the high temperature and pressure facilitate the hydrolysis of sodium metasilicate, ensuring a high concentration of reactive silicate species in solution. Concurrently, iron (III) chloride provides the iron ions ($Fe^{3+}$) that form the iron silicate framework. The combination of these ions in the hydrothermal environment leads to a series of condensation and polymerization reactions, where silicate and iron ions react to form $NaFeSi_2O_6$.

Initially, the precursors are dissolved in distilled water to create a homogeneous solution, ensuring that both sodium metasilicate pentahydrate and iron (III) chloride hexahydrate salts are evenly distributed. This mixture is then transferred to a high-pressure autoclave, where it is subjected to elevated temperatures typically ranging from 100° C. to 200° C. In some embodiments, the temperature may be 120° C., 140° C., 160° C., 170° C., 180° C., and 190° C. Under these hydrothermal conditions, the high temperature increases the solubility of the reactants and accelerates the reaction kinetics, facilitating the hydrolysis of sodium metasilicate and the release of silicate ions that react with iron ions from the iron chloride. This environment encourages the nucleation and growth of $NaFeSi_2O_6$ nanoparticles through a series of chemical reactions, ultimately resulting in the formation of a solid precipitate. The high pressure inside the autoclave helps to maintain the dissolution of reactants and ensures that the reaction proceeds to completion, leading to the production of nanoparticles with controlled size and morphology. After a specific reaction time, the autoclave is cooled, and the resulting $NaFeSi_2O_6$ nanoparticles are collected by filtration or centrifugation, followed by thorough washing to remove any unreacted materials or byproducts. The final product, a fine powder of $NaFeSi_2O_6$ nanoparticles, is suitable for further applications, such as in the development of nanocomposites or as adsorbents in environmental remediation technologies.

In one or more embodiments, the concentration of sodium metasilicate pentahydrate in the solution during the hydrothermal treatment is in a range from 0.3 to 0.8 M, preferably from 0.4 to 0.6M, more preferably between 0.5 and 0.6M, and most preferably 0.565 M. In one or more embodiments, the concentration of iron (III) chloride in the solution during the hydrothermal treatment is in a range from 0.05 to 0.25 M, preferably from 0.1 to 0.2 M, more preferably between 0.12 and 0.16 M, and most preferably 0.14 M.

In some embodiments, $NaFeSi_2O_6$ may exhibit various crystalline structures, such as orthorhombic, triclinic forms and hexagonal crystal phases. In a preferred embodiment, $NaFeSi_2O_6$ exhibit monoclinic crystal system. From X-Ray diffraction, the average crystallite size is calculated through the Scherrer equation, which relates the size of the crystallites to the broadening of the diffraction peaks observed in the XRD pattern. Smaller crystallite sizes generally lead to higher surface areas, enhancing reactivity and adsorption capabilities, which beneficial in applications in catalysis, environmental remediation, and drug delivery. In some embodiments, the average crystallite size of $NaFeSi_2O_6$ may range from 20 nm to 100 nm, with specific sizes including 20 nm, 50 nm, 75 nm, 90 nm, and 100 nm. In the preferred embodiment, the average crystallite size of the $NaFeSi_2O_6$ sample is 68.15 nm.

In some embodiments, the morphology of $NaFeSi_2O_6$ may be nanowires, nanospheres, nanospheroids, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and mixtures thereof. One with ordinary skill in the art will appreciate that various nanoscale morphologies such as those listed above may achieve similar performance, and that the list above provides examples and is not exhaustive of the many potential nanoscale forms. In a preferred embodiment, the $NaFeSi_2O_6$ sample shows a well-defined, rod-like structure with a uniform distribution, indicating the successful synthesis of the pure $NaFeSi_2O_6$ phase. The nanorod morphology indicates a high surface area, which can be advantageous for various applications.

In some embodiments, the morphology of $NaFeSi_2O_6$ nanoparticles is nanorods, wherein the nanorods have a length in a range from a lower limit of any of 0.15, 0.25, 0.35, 0.45, 0.55, and 0.65 µm to an upper limit of any of 0.75, 0.85, 0.95, 1.05, 1.15, 1.25, and 1.35 µm. In a preferred embodiment, the nanorods have a length in a range from 0.25 to 0.75 µm. In some embodiments, the nanorods have a diameter in a range from a lower limit of any of 50, 60, 70, 80, 90, and 100 nm to an upper limit of any of 150, 175, 200, 225, and 250 nm. In a preferred embodiment, the nanorods have a diameter in a range from 50 to 150 nm.

At step 54, the method 50 includes combining the $NaFeSi_2O_6$ nanoparticles with a solution comprising chitosan to form a precursor mixture. Chitosan is a biopolymer material derived from chitin found in crustacean exoskeletons. It is the second most abundant polysaccharide in nature, following cellulose. It is primarily derived from the waste shells of marine crustaceans such as shrimp, crabs, and lobsters. Chitosan, a derivative of chitin, is produced by deacetylating chitin in a basic medium, effectively removing the acetyl groups from its structure. This process yields a polymer that is unique in its chemical properties. Chitosan, a biopolymer derived from chitin, is chosen for its biocompatibility, biodegradability, and excellent binding properties, which make it an ideal matrix for enhancing the functionality of inorganic nanoparticles.

Chitosan is mixed with $NaFeSi_2O_6$ to create a nanocomposite that combines the advantageous properties of both materials, enhancing their functionality for various applications. Chitosan's biocompatibility and biodegradability make it an excellent matrix for embedding inorganic nanoparticles like $NaFeSi_2O_6$, allowing for the development of materials that are not only environmentally friendly but also safe for biomedical applications. The integration of $NaFeSi_2O_6$, known for its structural stability and adsorption capabilities, with chitosan facilitates improved performance in areas such as water treatment and pollutant removal, where the composite can effectively capture heavy metals and organic contaminants. Additionally, the unique chemical properties of chitosan can enhance the dispersibility and stability of the $NaFeSi_2O_6$ nanoparticles within the matrix, preventing aggregation and promoting a uniform distribution. This synergy also enables tunable properties, such as adjustable porosity and surface area, which allow for improvement of the composite for specific applications. Ultimately, the combination of chitosan and $NaFeSi_2O_6$ results in a versatile material that leverages the strengths of both components, making it suitable for a wide range of uses in environmental remediation, drug delivery, and catalysis.

The bonding between chitosan and $NaFeSi_2O_6$ in the nanocomposite is facilitated by a combination of physical and chemical interactions that enhance the stability and functionality of the resulting material. Chitosan, with its abundant amino ($-NH_2$) and hydroxyl ($-OH$) groups, can engage in hydrogen bonding and electrostatic interactions with the surface of $NaFeSi_2O_6$ nanoparticles. These functional groups enable strong adhesion between the organic polymer and the inorganic nanoparticles, ensuring that $NaFeSi_2O_6$ is effectively incorporated into the chitosan matrix. Additionally, the interaction may involve van der Waals forces, which contribute to the overall stability of the composite. In an aqueous environment, the presence of the chitosan matrix helps to prevent the agglomeration of $NaFeSi_2O_6$ particles, promoting a more uniform dispersion that maintains the desired properties of the nanocomposite. Moreover, the pH of the chitosan solution can influence the charge interactions, with the amino groups of chitosan becoming positively charged in acidic conditions, enhancing the electrostatic attraction to the negatively charged silicate ions. The preferable pH range for chitosan solutions to enhance the electrostatic attraction to negatively charged silicate ions is typically between 4.5 and 6.5. In this range, the amino groups of chitosan are protonated, resulting in a higher positive charge density, which promotes effective interactions with negatively charged silicate ions. pH values below 4.5 may lead to excessive protonation, while values above 6.5 may reduce the positive charge, weakening the electrostatic interactions. This bonding framework not only reinforces the structural integrity of the composite but also improves its functional characteristics, such as adsorption capacity and mechanical strength. Overall, the synergistic interactions between chitosan and $NaFeSi_2O_6$ play a role in the performance of the nanocomposite, enabling it to be tailored for specific applications in fields like environmental remediation, drug delivery, and catalysis.

In step 54, the $NaFeSi_2O_6$ nanoparticles are carefully dispersed in an aqueous chitosan solution, typically prepared by dissolving chitosan in a dilute acidic solution to ensure optimal solubility and polymer chain flexibility. In some embodiments, the dilute acid used may be acetic acid, citric acid, lactic acid, hydrochloric acid, or combinations thereof. In some embodiments, the pH of the dilute acidic solution may be in a range from 3 to 6.5, preferably 4.5 to 6. In some embodiments, the pH of the dilute acidic solution may be 4.5, 4.8, 5.0, 5.2, 5.4, 5.6, 5.8 and 6.0. In one or more embodiments, acetic acid is used, and the concentration of acetic acid in the chitosan solution is in a range from 0.85 to 1.25 M, preferably 0.95 to 1.15M, more preferably 1.00 to 1.10 M, and most preferably 1.05M. This acidic environment maximizes the solubility of chitosan, as the protonation of its amino groups enhances the polymer's hydrophilicity and ensures that chitosan remains in a dissolved state. As the chitosan dissolves, the polymer chains become more flexible, allowing them to interact effectively with the $NaFeSi_2O_6$ nanoparticles during mixing. In one or more embodiments, the concentration of chitosan in the chitosan solution is in a range from 5 to 20 g/L, preferably 10 to 14 g/L, more preferably 11 to 13 g/L, and most preferably 12 g/L. In one or more embodiments, the concentration of $NaFeSi_2O_6$ nanoparticles, once dispersed in the precursor solution, is in a range from 5 to 20 g/L, preferably 10 to 14 g/L, more preferably 11 to 13 g/L, and most preferably 12 g/L.

The stirring or sonication applied during this process promotes a uniform distribution of the nanoparticles throughout the chitosan matrix, preventing agglomeration and ensuring that each nanoparticle is well-encapsulated by the polymer. This uniform dispersion achieves consistent properties in the final nanocomposite, such as mechanical strength, surface area, and adsorption capacity. Additionally, the interactions between the functional groups of chitosan—such as its amino and hydroxyl groups—and the surface of the $NaFeSi_2O_6$ nanoparticles facilitate strong bonding, enhancing the overall stability of the composite.

At step 56, the method 50 includes treating the precursor mixture with sodium hydroxide to form the mesoporous chitosan/$NaFeSi_2O_6$ nanocomposite. The addition of sodium hydroxide serves several functions: it raises the pH of the mixture, facilitating the deprotonation of amino groups in chitosan, which enhances the polymer's interaction with the $NaFeSi_2O_6$ nanoparticles. This increase in alkalinity stabilizes the composite structure and promotes cross-linking between chitosan chains, resulting in improved mechanical strength and structural integrity. The alkaline conditions also foster the formation of ionic and hydrogen bonds between the negatively charged silicate ions of $NaFeSi_2O_6$ and the positively charged amino groups of chitosan, thereby strengthening adhesion and overall stability of the composite. Furthermore, the alkalinity aids in dissolving any excess chitosan, preventing nanoparticle agglomeration and ensuring a uniform distribution throughout the matrix. As the reaction continues, NaOH contributes to the development of a mesoporous structure characterized by interconnected pores, which increases the surface area and pore volume of the composite. This mesoporosity enhances the material's adsorption capacity, making it particularly effective for environmental remediation applications, such as pollutant capture and water treatment. Overall, the treatment with sodium hydroxide not only facilitates the formation of this porous architecture but also optimizes the functional characteristics of the nanocomposite, allowing it to meet the needs of various industrial and environmental applications. Upon completion of this step, the resulting mesoporous chitosan/$NaFeSi_2O_6$ nanocomposite demonstrates a unique combination of mechanical robustness, high surface area, and enhanced chemical reactivity, making it a versatile material for a broad range of uses.

Suitable hydroxide alternatives include potassium hydroxide (KOH), calcium hydroxide ($Ca(OH)_2$), lithium hydroxide (LiOH), barium hydroxide ($Ba(OH)_2$), magnesium hydroxide ($Mg(OH)_2$), ammonium hydroxide ($NH_4OH$), and sodium carbonate ($Na_2CO_3$). In a preferred embodiment, sodium hydroxide is used.

In one or more embodiments, treating the precursor mixture with sodium hydroxide includes adding the precursor solution to a base solution. In one or more embodiments, the base solution includes NaOH at a concentration in a range from 0.4 to 0.9 M, preferably from 0.5 to 0.8 M, more preferably from 0.6 to 0.7 M, and most preferably 0.65 M. In some embodiments, the solution may comprise 10 to 20 wt. % NaOH, preferably 11 wt. % NaOH, preferably 12 wt. % NaOH, preferably 13 wt. % NaOH, preferably 14 wt. % NaOH, preferably 15 wt. % NaOH, preferably 16 wt. % NaOH, preferably 17 wt. % NaOH, preferably 18 wt. % NaOH, preferably 19 wt. % NaOH, preferably 20 wt. % NaOH, or a desired shape can be achieved by adjusting the selected weight percentage (wt. %) of sodium hydroxide, ensuring optimal formation and consistency in the final structure.

In some embodiments, the morphology of chitosan/$NaFeSi_2O_6$ nanocomposite may be nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and mixtures thereof. One with ordinary skill in the art will appreciate that various nanoscale morphologies such as those listed above may achieve similar performance, and that the list above provides examples and is not exhaustive of the many potential nanoscale forms. In the preferred embodiment, the morphology of the chitosan/$NaFeSi_2O_6$ nanocomposite displays a structure in which the chitosan matrix is clearly visible, enveloping and aggregating the $NaFeSi_2O_6$ nanoparticles, which are present in the form of rods. The overall structure of the chitosan/$NaFeSi_2O_6$ nanocomposite may be globular or may take the form of any typical nanoscale morphology as listed above, or it may be agglomerated into a larger scale structure. The presence of agglomerated $NaFeSi_2O_6$ particles within the chitosan matrix indicates that the nanoparticles have been successfully incorporated, contributing to the overall stability and functionality of the material. Furthermore, the effective synthesis and integration of chitosan with $NaFeSi_2O_6$ lead to synergistic effects, where the unique properties of both components—such as the biocompatibility and biodegradability of chitosan and the structural stability of $NaFeSi_2O_6$—are combined to create a versatile material. This morphology confirms the successful development of the nanocomposite and underlines its potential for diverse applications in fields ranging from environmental science to biomedical engineering.

The nanocomposite includes chitosan and $NaFeSi_2O_6$, where the chitosan envelops and aggregates nanoparticles of the $NaFeSi_2O_6$ in the form of rods. This encapsulation not only provides physical protection to the nanoparticles from agglomeration and environmental degradation but also enhances the overall mechanical properties of the composite. Furthermore, the chitosan matrix can facilitate the dispersion of $NaFeSi_2O_6$, allowing for a more uniform distribution of the nanoparticles within the composite. This arrangement can lead to improved performance characteristics, such as increased magnetic properties, catalytic activity, or adsorption capabilities, depending on the intended application. The synergy between the chitosan and $NaFeSi_2O_6$ in this nanocomposite opens possibilities for innovative uses in fields such as biotechnology, materials science, and environmental engineering.

The nanocomposite structure where chitosan envelops and aggregates the nanoparticles of $NaFeSi_2O_6$ into rod-like structures presents opportunities for surface area enhancement. The high surface area of the $NaFeSi_2O_6$ nanoparticles contributes beneficially to the overall properties of the composite. When these nanoparticles are organized into elongated rods, their aspect ratio increases, effectively maximizing the surface area available for interactions. The chitosan matrix plays a pivotal role in this configuration, as it not only surrounds the nanoparticles but also facilitates their spatial arrangement, preventing agglomeration and maintaining a high degree of dispersion. This architecture results in a composite material that boasts a greater number of active sites, which can enhance properties such as adsorption capacity, catalytic efficiency, and reactivity. Furthermore, the increased surface area allows for improved interaction with surrounding media-whether in biological, environmental, or industrial applications-leading to enhanced performance.

Nitrogen adsorption-desorption analysis is a fundamental technique used to characterize the porous structure of materials, providing information about mean pore diameter, surface area, and total pore volume. The mean pore diameter is derived from the adsorption isotherm using methods such as the Barrett-Joyner-Halenda (BJH) method, which analyzes the desorption branch of the isotherm. This measurement reveals the average size of the pores, which allows for understanding how the material will interact with different molecules and how effectively it can facilitate processes like adsorption and catalysis. The surface area, often calculated using the Brunauer-Emmett-Teller (BET) method, quantifies the total area available for adsorption per unit mass of the material, typically expressed in square meters per gram ($m^2/g$). A higher surface area indicates a greater number of active sites for interactions, making the material more effective for applications such as drug delivery, catalysis, and environmental remediation. Total pore volume, which represents the volume of all the pores within the material, is also determined during the analysis and allows for assessment of the material's capacity to store and transport fluids. This parameter, typically expressed in cubic centimeters per gram ($cm^3/g$), helps in evaluating how much substance can be accommodated within the pores. Collectively, these measurements provide a comprehensive understanding of the material's porous architecture, guiding the design and optimization of materials for specific industrial, environmental, and biomedical applications. By tailoring the mean pore diameter, surface area, and total pore volume, researchers can engineer materials with enhanced performance characteristics suited to their intended use.

The mean pore diameter of a mesoporous material, as measured by nitrogen adsorption-desorption analysis, provides insight into the material's porous structure and its potential applications. This technique relies on the principle of gas adsorption, where nitrogen gas is introduced to the material under controlled conditions. During the adsorption phase, nitrogen molecules penetrate the pores, allowing for the measurement of the volume of gas adsorbed at various pressures. As the pressure decreases in the desorption phase, the nitrogen molecules are released, providing further data on pore size distribution. The mean pore diameter can be calculated using the Barrett-Joyner-Halenda (BJH) method, which analyzes the desorption branch of the isotherm to determine pore sizes.

The classification of porous materials into mesoporous and microporous categories is primarily determined by their mean pore diameters, which influence their properties and applications. Microporous materials have pore diameters less than 2 nm, which allows them to effectively trap small molecules and gases. These materials are typically characterized by high surface areas and are commonly used in applications such as gas separation, catalysis, and ion exchange, where the ability to interact with small molecules is beneficial. In contrast, mesoporous materials possess pore diameters ranging from 2 nm to 50 nm, making them well-suited for accommodating larger molecules and facilitating processes that require greater fluid flow and accessibility. With mean pore diameters typically exceeding 2 nm and potentially reaching up to 50 nm, mesoporous materials exhibit enhanced adsorption capabilities and are particularly valuable in applications like drug delivery, where larger therapeutic agents must be encapsulated and released in a controlled manner. The presence of these two distinct pore size categories highlights the versatility of porous materials, as each type offers unique advantages that can be tailored to specific needs in various fields, including environmental remediation, energy storage, and biomedical engineering. Understanding the implications of pore size allows for optimizing the performance and functionality of these materials in real-world applications.

In some embodiments, the mesoporous chitosan/$NaFeSi_2O_6$ nanocomposite may have a mean pore diameter of greater than 15 nm as measured by nitrogen adsorption-desorption analysis. A mean pore diameter greater than 15 nm indicates that the material falls within the mesoporous range. In some embodiments, the mesoporous chitosan/$NaFeSi_2O_6$ nanocomposite may have a mean pore diameter of greater than 25 nm as measured by nitrogen adsorption-desorption analysis. In some embodiments, the mesoporous chitosan/$NaFeSi_2O_6$ nanocomposite may have a mean pore diameter of greater than 35 nm as measured by nitrogen adsorption-desorption analysis. Larger mean pore diameters, such as those exceeding 25 nm and 35 nm, indicate a more pronounced capacity for hosting larger molecules thereby enhancing adsorption capacity and facilitating the transport of species within the composite. In a preferred embodiment, the mesoporous chitosan/$NaFeSi_2O_6$ nanocomposite has a mean pore diameter of 40.28 nm as measured by nitrogen adsorption-desorption analysis. This indicates a well-developed mesoporous structure that enhances the material's surface area and allows for improved accessibility to the internal pore network. Additionally, the hierarchical pore structure promotes a greater flow of fluids, improving the overall kinetics of interactions, such as adsorption and desorption processes.

The specific surface area of a material, as measured by nitrogen adsorption-desorption analysis, is a parameter that reflects the total surface area available for adsorption per unit mass of the material, typically expressed in square meters per gram ($m^2/g$). This measurement is primarily derived using the Brunauer-Emmett-Teller (BET) method, which analyzes the adsorption isotherm obtained during the nitrogen gas adsorption process. In this analysis, nitrogen is introduced to the sample under controlled conditions, allowing gas molecules to adsorb onto the surface and within the pores of the material. The BET method utilizes the principle that, under certain conditions, the amount of gas adsorbed can be correlated to the surface area. The data obtained from the isotherm are used to calculate the monolayer coverage of nitrogen, which, in turn, allows for the determination of the total surface area.

In some embodiments, the mesoporous chitosan/NaFeSi$_2$O$_6$ nanocomposite has a BET surface area of greater than 5 m$^2$·g$^{-1}$ as measured by nitrogen adsorption-desorption analysis. A surface area greater than 5 m$^2$/g indicates that the composite can effectively capture and retain larger quantities of biomolecules or pollutants, making it particularly suitable for applications in drug delivery or environmental remediation. In some embodiments, the mesoporous chitosan/NaFeSi$_2$O$_6$ nanocomposite has a BET surface area of greater than 7 m$^2$·g$^{-1}$ as measured by nitrogen adsorption-desorption analysis. As the surface area rises to 7 m$^2$/g and beyond, the potential for enhanced performance becomes even more pronounced, allowing for better kinetics in adsorption processes and facilitating more efficient drug release profiles. In some embodiments, the mesoporous chitosan/NaFeSi$_2$O$_6$ nanocomposite has a BET surface area of greater than 9 m$^2$·g$^{-1}$ as measured by nitrogen adsorption-desorption analysis. In a preferred embodiment, the mesoporous chitosan/NaFeSi$_2$O$_6$ nanocomposite has a BET surface area of 10.94 m$^2$·g$^{-1}$ as measured by nitrogen adsorption-desorption analysis. A higher specific surface area indicates a greater number of active sites available for chemical interactions, making the material particularly advantageous in applications such as catalysis, drug delivery, and adsorption processes. For instance, materials with high surface area are more effective at trapping contaminants in environmental applications or enhancing the release profile of drugs in biomedical settings. The tunable nature of the BET surface area in this nanocomposite highlights its versatility, as it can be engineered for specific needs-whether to maximize adsorption in wastewater treatment or to optimize bioavailability in pharmaceutical applications. Overall, the measured BET surface area underscores the material's promise as a multifunctional platform in both environmental and biomedical fields.

Total pore volume, as measured by nitrogen adsorption-desorption analysis, is a metric that quantifies the volume of all the pores within a material, typically expressed in cubic centimeters per gram (cm$^3$/g). This measurement is derived from the adsorption isotherm obtained during the nitrogen adsorption process, where nitrogen gas is introduced to the sample, allowing it to infiltrate the material's pores. During this process, the amount of nitrogen adsorbed at various pressures provides insights into the pore structure and the capacity of the material to accommodate gases or liquids. The total pore volume is calculated based on the volume of nitrogen adsorbed at high relative pressures, where the pores are fully saturated with the gas.

In some embodiments, the mesoporous chitosan/NaFeSi$_2$O$_6$ nanocomposite has a total pore volume of greater than 0.05 cm$^3$·g$^{-1}$ as measured by nitrogen adsorption-desorption analysis. A total pore volume greater than 0.05 cm$^3$/g indicates that the composite can effectively accommodate amounts of gases or liquids, which beneficial for processes such as adsorption, catalysis, and drug delivery. In some embodiments, the mesoporous chitosan/NaFeSi$_2$O$_6$ nanocomposite has a total pore volume of greater than 0.07 cm$^3$·g$^{-1}$ as measured by nitrogen adsorption-desorption analysis. In some embodiments, the mesoporous chitosan/NaFeSi$_2$O$_6$ nanocomposite has a total pore volume of greater than 0.09 cm$^3$·g$^{-1}$ as measured by nitrogen adsorption-desorption analysis. As the total pore volume increases to values above 0.07 cm$^3$/g and 0.09 cm$^3$/g, the potential for enhanced performance becomes increasingly apparent. For instance, a higher pore volume facilitates greater interaction with surrounding media, improving the kinetics of adsorption processes and allowing for more efficient capture of pollutants or biomolecules. In a preferred embodiment, the mesoporous chitosan/NaFeSi$_2$O$_6$ nanocomposite has a total pore volume of 0.110 cm$^3$·g$^{-1}$ as measured by nitrogen adsorption-desorption analysis. In catalysis, a larger pore volume can enhance the accessibility of reactants to active sites within the material, thereby improving reaction rates and efficiencies. Furthermore, total pore volume helps determine the material's adsorption capabilities, as it directly influences how much contaminant or biomolecule can be captured within the porous network. Additionally, this tunable pore volume reflects the material's versatility, enabling customization for specific industrial and biomedical needs. Overall, the measured total pore volume underscores the potential of the mesoporous chitosan/NaFeSi$_2$O$_6$ nanocomposite as a multifunctional platform, optimizing its efficacy across various applications in environmental and health-related fields.

The nitrogen adsorption-desorption isotherm curve allows for understanding the adsorption properties and pore structure of materials. These curves graphically depict how a material adsorbs gas at a constant temperature, offering valuable insights into the interactions between the adsorbate (nitrogen) and the adsorbent (the porous material). Different isotherm types, classified by the IUPAC system, indicate varying characteristics; for instance, Type I indicates microporous materials with rapid adsorption and minimal hysteresis, while Type IV, marked by hysteresis loops, indicates mesopores and capillary condensation. The shape of the isotherm provides information about adsorption capacity, pore size distribution, and connectivity, which allows for specific applications like gas storage, catalysis, and drug delivery.

In some embodiments, the mesoporous chitosan/NaFeSi$_2$O$_6$ nanocomposite may exhibit a Type I, Type II, and/or Type III nitrogen adsorption-desorption isotherm. In a preferred embodiment, the mesoporous chitosan/NaFeSi$_2$O$_6$ nanocomposite exhibits a Type IV nitrogen adsorption-desorption isotherm, characterized by a distinct H3 hysteresis loop. This specific isotherm classification indicates the presence of mesopores, which typically range from 2 to 50 nm in diameter. The Type IV isotherm is commonly associated with materials that possess a well-defined pore structure, demonstrating capillary condensation in the mesoporous region. The presence of the H3 hysteresis loop indicates a particular pore geometry, often attributed to aggregates of plate-like particles that create slit-shaped pores. This configuration allows for the gradual filling and emptying of pores, which is reflected in the hysteresis loop's shape. The occurrence of the H3 hysteresis loop indicates that the nanocomposite has a good capacity for adsorbing and retaining gases or liquids, enhancing its potential applications in areas such as catalysis, drug delivery, and environmental remediation. The loop indicates that, during the adsorption process, nitrogen gas initially fills the larger pores, while desorption occurs more gradually due to the complex interactions within the pore network. This behavior indicates that the nanocomposite's porous structure is conducive to trapping substances, making it highly effective for applications that require controlled release or sustained adsorption. Additionally, the characteristics of the isotherm can provide insights into the uniformity and connectivity of the pores, improving the material's performance in various industrial and biomedical applications. Overall, the Type IV isotherm with an H3 hysteresis loop highlights the mesoporous chitosan/NaFeSi$_2$O$_6$ nanocomposite's tailored structural properties, which can be strategically leveraged for enhanced functionality.

EXAMPLES

The following examples demonstrate the preparation of modified chitosan/$NaFeSi_2O_6$ nanocomposite. The examples are provided solely for illustration and are not to be construed as limitations of the present disclosure, as many variations thereof are possible without departing from the spirit and scope of the present disclosure.

Example 1: Method

The present disclosure involves the synthesis of a chitosan/$NaFeSi_2O_6$ nanocomposite using a simple and efficient method that incorporates chitosan into $NaFeSi_2O_6$ nanoparticles. The process is initiated by synthesizing $NaFeSi_2O_6$ nanoparticles through a hydrothermal treatment of a mixture containing sodium metasilicate pentahydrate and iron(III) chloride hexahydrate. The nanoparticles are then incorporated into a chitosan solution to produce the nanocomposite, which is subsequently treated with sodium hydroxide to promote uniform composite formation. This invention provides a reproducible and scalable method for creating a nanocomposite with enhanced structural and functional properties, making it suitable for various commercial applications. The advantages include a streamlined synthesis process that avoids the need for complex procedures or hazardous chemicals, resulting in a material with tunable porosity and surface area.

Example 2: Synthesis of $NaFeSi_2O_6$

To synthesize $NaFeSi_2O_6$ nanoparticles, 12.00 g of sodium metasilicate pentahydrate ($Na_2SiO_3 \cdot 5H_2O$) was dissolved in 50 mL of distilled water. Separately, 3.81 g of iron(III) chloride hexahydrate ($FeCl_3 \cdot 6H_2O$) was dissolved in 50 mL of distilled water. The iron(III) chloride solution was then added to the sodium metasilicate solution with constant stirring for 15 min. The resulting solid powder/water mixture was transferred into a 170 mL Teflon-lined stainless-steel autoclave and subjected to hydrothermal treatment at 180° C. for 12 hrs. Afterward, the produced powder (i.e. $NaFeSi_2O_6$ nanoparticles) were filtered, washed with distilled water, and dried at 60° C.

Example 3: Synthesis of Chitosan/$NaFeSi_2O_6$ Nanocomposite

To synthesize the nanocomposite, 1.50 g of chitosan was dissolved in 125 mL of 1.05 M acetic acid solution. Subsequently, 1.50 g of powdered $NaFeSi_2O_6$ nanoparticles was added to the chitosan solution with continuous stirring for 2 hrs. The resulting powder nanoparticles/chitosan/acetic acid mixture was then transferred into 250 mL of 0.65 M NaOH solution and stirred continuously for an additional 2 hrs. The formed nanocomposite product was filtered, thoroughly washed with distilled water to remove impurities, and then air-dried.

Example 4: Characterization

The structural properties of the synthesized materials have been thoroughly characterized through various analytical techniques, including X-ray diffraction (XRD), scanning electron microscopy (SEM), and nitrogen adsorption-desorption isotherms. XRD analysis confirms the successful formation of $NaFeSi_2O_6$ with monoclinic crystal symmetry, while the presence of chitosan in the nanocomposite is validated by additional peaks specific to chitosan. SEM imaging reveals the distinct rod-like morphology of $NaFeSi_2O_6$, which changes to a more porous and aggregated structure in the chitosan/$NaFeSi_2O_6$ composite, indicating effective incorporation of chitosan. The nitrogen adsorption-desorption data show that while the BET surface area and total pore volume of the chitosan/$NaFeSi_2O_6$ nanocomposite are reduced compared to $NaFeSi_2O_6$ alone, the average pore diameter increases, confirming the formation of larger mesopores.

Example 5: Materials and Prototypes

The synthesized $NaFeSi_2O_6$ nanoparticles and chitosan/$NaFeSi_2O_6$ nanocomposites have been successfully produced and characterized, proving the feasibility and reproducibility of the invention. The characterization results show that this material can be tailored for applications requiring mesoporous structures, such as in adsorption and environmental remediation.

Example 6: Commercial Applications

The invention has potential commercial applications in areas that benefit from materials with high surface area and controlled porosity, such as in water treatment, biomedicine, and catalysis. The tunable nature of the pore structure in the nanocomposite, combined with the biocompatibility of chitosan, makes it a promising candidate for industries requiring advanced functional materials with customizable properties.

Figure 2A:
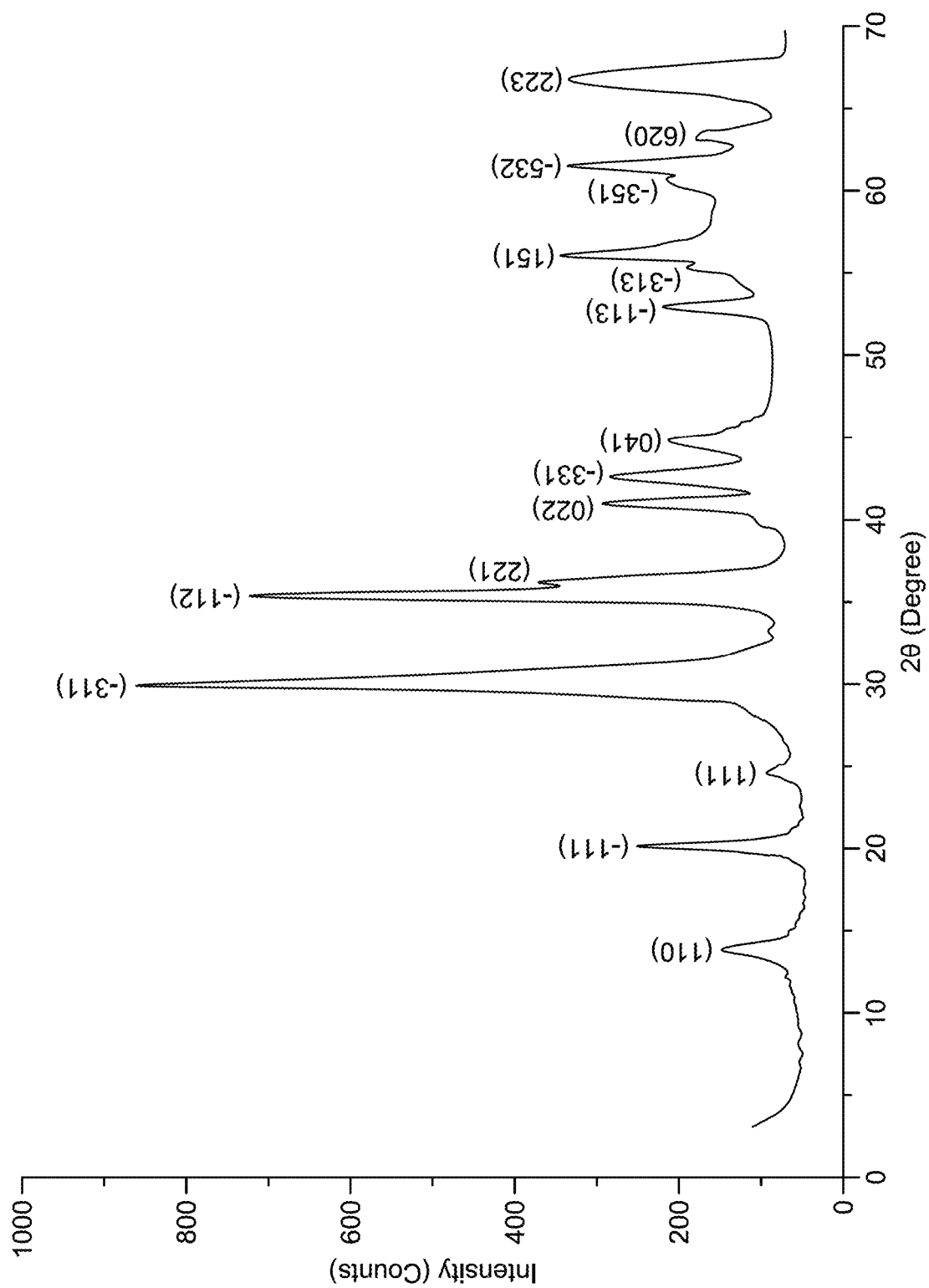
FIG. 2A shows a clear wide-Angle X-ray diffraction (WXRD) pattern for $NaFeSi_2O_6$, according to certain embodiments.
Figure 2B:
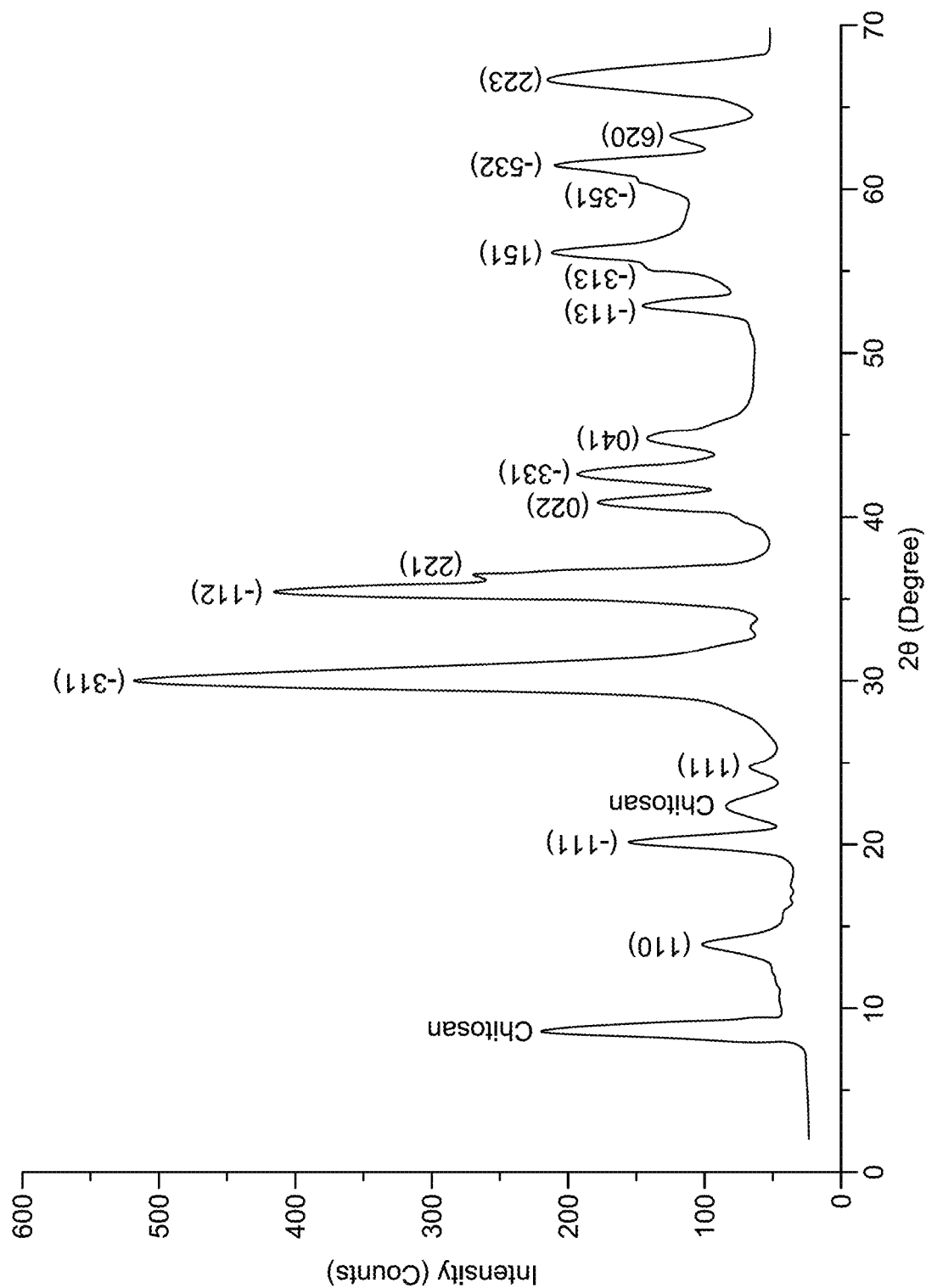
FIG. 2B shows a clear wide-angle X-ray diffraction (WXRD) pattern for chitosan/$NaFeSi_2O_6$ nanocomposite, according to certain embodiments.

The X-ray diffraction (XRD) patterns of the $NaFeSi_2O_6$ and chitosan/$NaFeSi_2O_6$ nanocomposite are presented in FIGS. 2A-B, respectively. For the $NaFeSi_2O_6$ sample (FIG. 2A), characteristic peaks corresponding to a monoclinic crystal system (JCPDS No. 00-003-0621) were observed at diffraction angles of 13.77°, 20.110, 24.59°, 30.12°, 35.35°, 36.09°, 40.95°, 42.50°, 44.70°, 52.88°, 55.17°, 56.09°, 60.41°, 61.41°, 63.17°, and 66.65°. These peaks are indexed to the Miller indices of (110), (−111), (111), (−311), (−112), (221), (022), (−331), (041), (−113), (−313), (151), (−351), (−532), (620), and (223), respectively. The average crystallite size of the $NaFeSi_2O_6$ sample was 68.15 nm. For the chitosan/$NaFeSi_2O_6$ nanocomposite (FIG. 2B), in addition to the peaks attributed to $NaFeSi_2O_6$, characteristic peaks of chitosan were observed at diffraction angles of 8.70° and 22.20°, indicating successful composite formation.

Figure 3A:
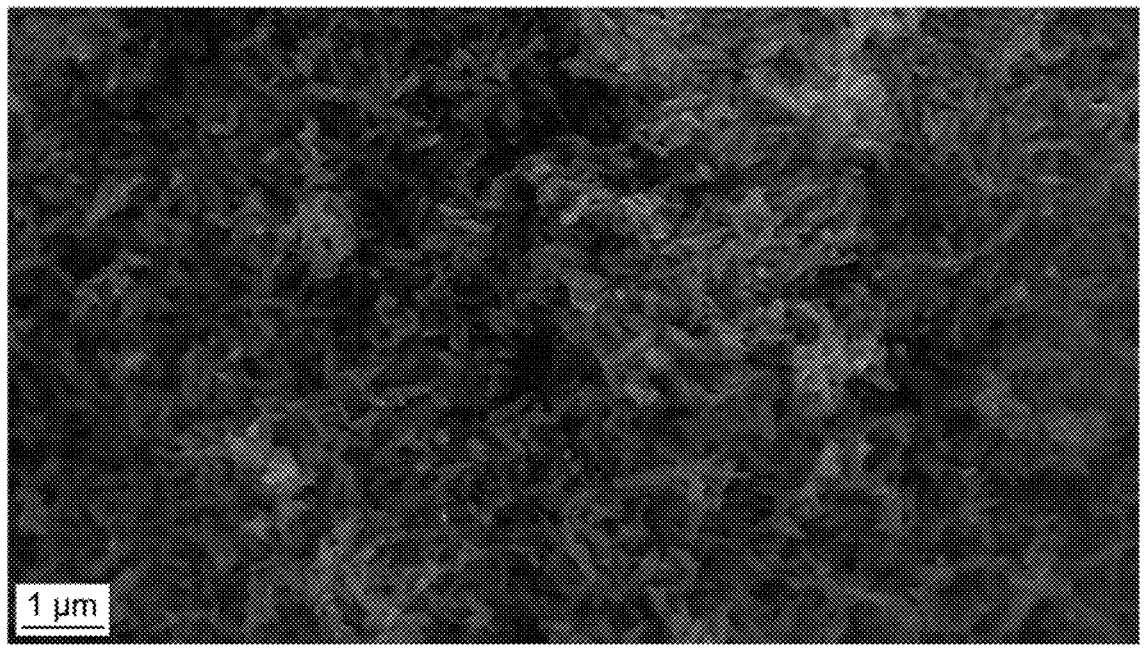
FIG. 3A shows a scanning electron microscope (SEM) image showing uniform distribution of nanorod morphology, according to certain embodiments.
Figure 3B:
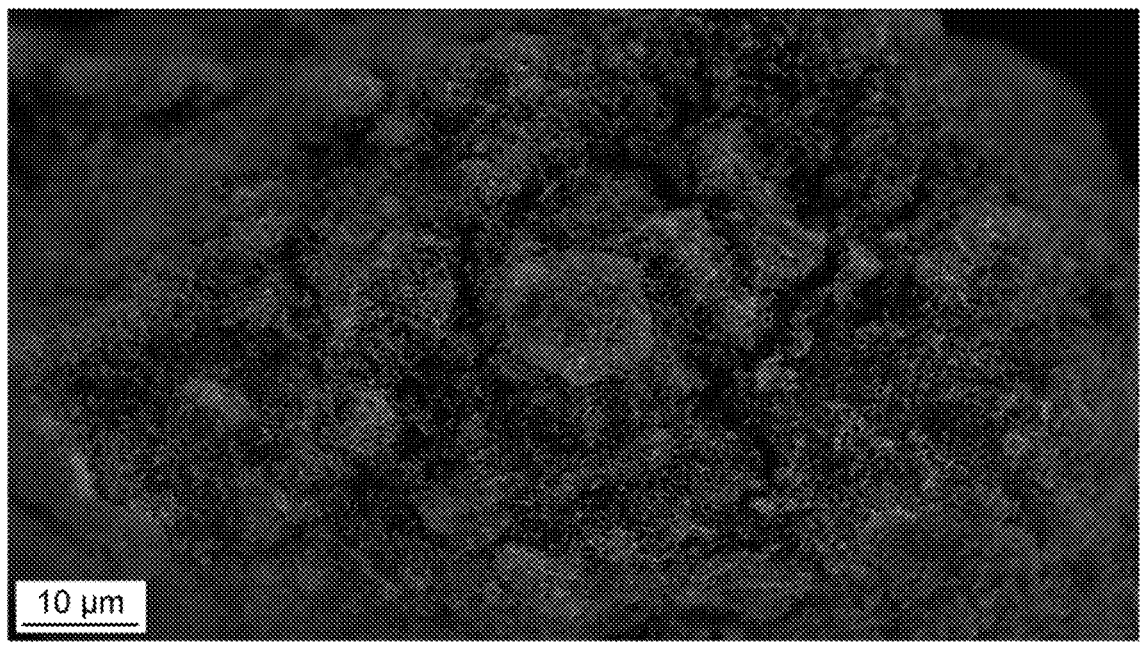
FIG. 3B shows a scanning electron microscope (SEM) image of a modified chitosan/$NaFeSi_2O_6$ nanocomposite, according to certain embodiments.

The scanning electron microscopy (SEM) images presented in FIG. 3 illustrate the morphological characteristics of $NaFeSi_2O_6$ (FIG. 3A) and the chitosan/$NaFeSi_2O_6$ nanocomposite (FIG. 3B). In FIG. 3A, the $NaFeSi_2O_6$ sample shows a well-defined, rod-like structure with a uniform distribution, indicating the successful synthesis of the pure $NaFeSi_2O_6$ phase. The nanorod morphology indicates a high surface area, which can be advantageous for various applications. In contrast, FIG. 3B displays the chitosan/$NaFeSi_2O_6$ nanocomposite, where the chitosan matrix is visible, enveloping and aggregating the $NaFeSi_2O_6$ particles. The composite exhibits a more irregular and porous structure, typical when combining a polymer like chitosan with inorganic nanoparticles. The porous nature and the presence of agglomerated particles in the composite indicate the successful incorporation of chitosan, contributing to enhanced surface interactions in potential applications. The overall morphology confirms the effective synthesis and integration of chitosan and $NaFeSi_2O_6$ in the nanocomposite. The average length of the nanorods as measured by SEM is in a range from a lower limit of any of 0.15, 0.25, 0.35, 0.45, 0.55, and 0.65 µm to an upper limit of any of 0.75, 0.85, 0.95, 1.05, 1.15, 1.25, and 1.35 µm. In a preferred embodiment, the average length of the nanorods as measured by SEM is in a range from 0.25 to 0.75 µm. In some embodiments, the average diameter of the nanorods as measured by SEM is in a range from a lower limit of any of 50, 60, 70, 80, 90, and 100 nm to an upper limit of any of 150, 175, 200, 225, and 250 nm. In a preferred embodiment, the average diameter of the nanorods as measured by SEM is in a range from 50 to 150 nm.

Figure 4:
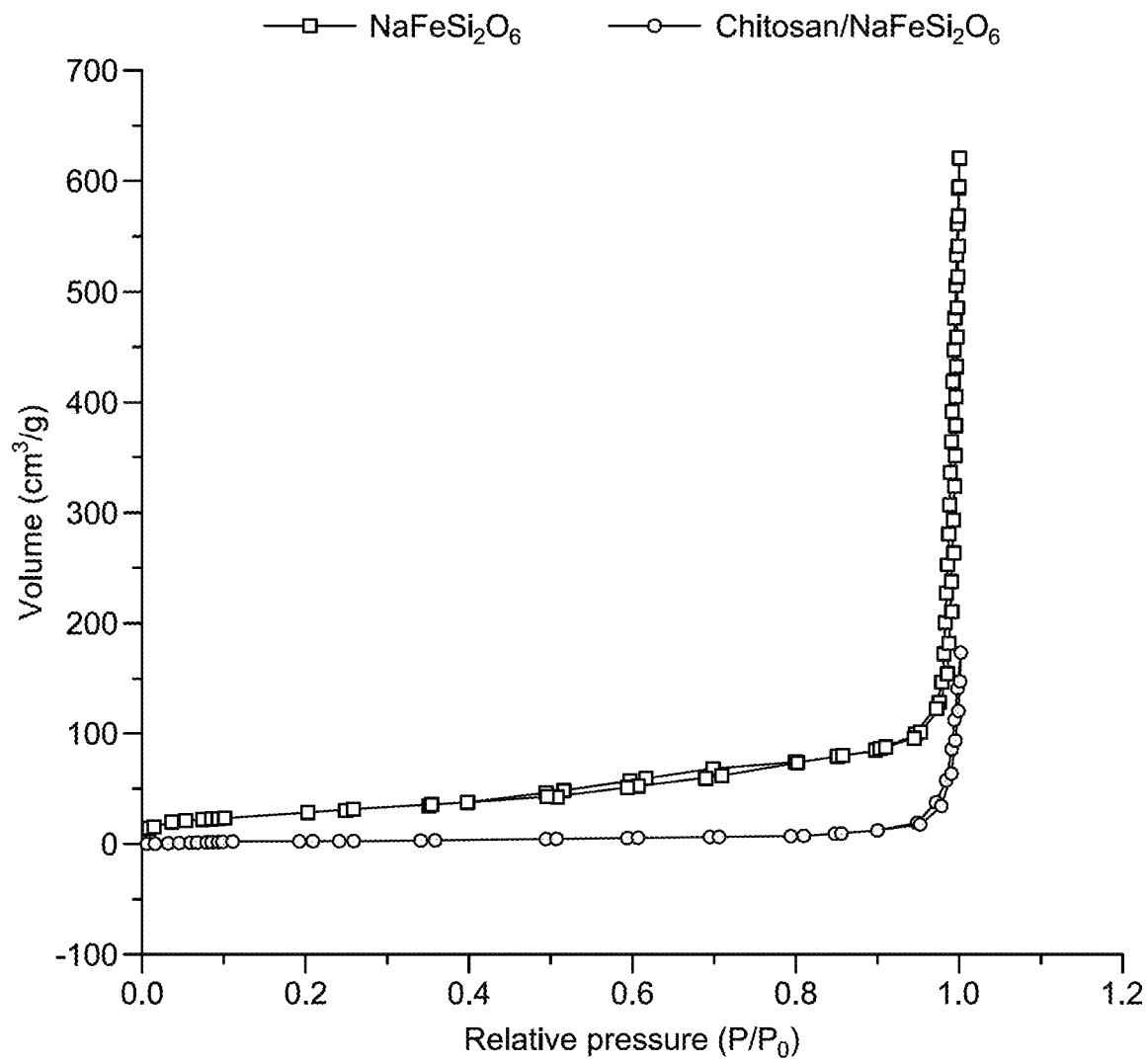
FIG. 4 presents a comparative graph of the adsorption-desorption isotherms for $NaFeSi_2O_6$ nanoparticles and the modified chitosan/$NaFeSi_2O_6$ nanocomposites, according to certain embodiments.

The nitrogen adsorption-desorption isotherms and the surface texture properties of $NaFeSi_2O_6$ nanoparticles and chitosan/$NaFeSi_2O_6$ nanocomposites are presented in FIG. 4 and Table 1, respectively. The $NaFeSi_2O_6$ sample exhibits a higher BET surface area of 106.74 $m^2/g$ and a total pore volume of 0.3804 $cm^3/g$ compared to the chitosan/$NaFeSi_2O_6$ nanocomposite, which has a BET surface area of 10.94 $m^2/g$ and a total pore volume of 0.1101 $cm^3/g$. The lower surface area and total pore volume of the chitosan/$NaFeSi_2O_6$ nanocomposite can be attributed to the coating of $NaFeSi_2O_6$ nanoparticles with chitosan, which reduces the accessible surface area and blocks some of the pores. Additionally, the chitosan matrix tends to fill and cover the smaller pores, reducing the overall pore volume. Interestingly, the mean pore diameter of the chitosan/$NaFeSi_2O_6$ nanocomposite is larger at 40.28 nm compared to 14.26 nm for the $NaFeSi_2O_6$ sample. This increase in pore diameter may be due to the formation of larger interstitial spaces between the chitosan-coated $NaFeSi_2O_6$ nanoparticles, resulting in broader pores. The type of pores in both samples can be classified as mesopores, as the average pore diameters are greater than 2 nm. This classification is supported by the observed pore sizes, confirming that the pores in both the $NaFeSi_2O_6$ nanoparticle and chitosan/$NaFeSi_2O_6$ nanocomposite fall within the mesoporous range. The nitrogen adsorption-desorption isotherms in FIG. 4 exhibit a Type IV isotherm with an H3 hysteresis loop, typical of mesoporous materials. The overall analysis highlights that while the chitosan coating reduces surface area and pore volume, it leads to the formation of larger mesopores within the composite structure, consistent with the textural data presented in Table 1.

TABLE 1

Surface textures of the $NaFeSi_2O_6$ and chitosan/$NaFeSi_2O_6$ nanocomposite.

| Samples | BET surface area ($m^2/g$) | Total pore volume ($cm^3/g$) | Mean pore diameter (nm) |
|---|---|---|---|
| $NaFeSi_2O_6$ | 106.74 | 0.3804 | 14.26 |
| Chitosan/$NaFeSi_2O_6$ nanocomposite | 10.94 | 0.1101 | 40.28 |

The present disclosure describes the facile synthesis of chitosan/$NaFeSi_2O_6$ nanocomposite. The synthesis process is efficient, and environmentally friendly, involving a hydrothermal treatment of $NaFeSi_2O_6$ followed by the incorporation of chitosan, which provides additional functional properties. The combination of chitosan and $NaFeSi_2O_6$ in a single nanocomposite integrates the biocompatibility and biodegradability of chitosan with the structural stability and functional properties of $NaFeSi_2O_6$. The resulting material exhibits unique textural properties, such as increased pore diameter and a mesoporous structure, which are not commonly achieved in conventional nanocomposites. The invention addresses limitations in existing technologies by providing a versatile and reproducible nanocomposite with enhanced functionality for potential applications across various fields.

Numerous modifications and variations of the present disclosure are possible in light of the above teachings. It is therefore to be understood that within the scope of the appended claims, the invention may be practiced otherwise than as specifically described herein.

The invention claimed is:

1. A method for producing a mesoporous chitosan/$NaFeSi_2O_6$ nanocomposite, the method comprising:
   hydrothermally treating a mixture comprising sodium metasilicate pentahydrate and iron(III) chloride hexahydrate to form $NaFeSi_2O_6$ nanoparticles;
   combining the $NaFeSi_2O_6$ nanoparticles with a solution comprising chitosan to form a precursor mixture; and
   treating the precursor mixture with sodium hydroxide to form the mesoporous chitosan/$NaFeSi_2O_6$ nanocomposite,
   wherein the chitosan envelops and aggregates nanoparticles of the $NaFeSi_2O_6$ in the form of rods, and
   wherein the mesoporous chitosan/$NaFeSi_2O_6$ nanocomposite has a mean pore diameter of greater than 15 nm as measured by nitrogen adsorption-desorption analysis.

2. The method of claim 1, wherein the mesoporous chitosan/$NaFeSi_2O_6$ nanocomposite has a mean pore diameter of greater than 25 nm as measured by nitrogen adsorption-desorption analysis.

3. The method of claim 2, wherein the mesoporous chitosan/$NaFeSi_2O_6$ nanocomposite has a mean pore diameter of greater than 35 nm as measured by nitrogen adsorption-desorption analysis.

4. The method of claim 1, wherein the mesoporous chitosan/$NaFeSi_2O_6$ nanocomposite has a BET surface area of greater than 5 $m^2 \cdot g^{-1}$ as measured by nitrogen adsorption-desorption analysis.

5. The method of claim 4, wherein the mesoporous chitosan/$NaFeSi_2O_6$ nanocomposite has a BET surface area of greater than 7 $m^2 \cdot g^{-1}$ as measured by nitrogen adsorption-desorption analysis.

6. The method of claim 5, wherein the mesoporous chitosan/$NaFeSi_2O_6$ nanocomposite has a BET surface area of greater than 9 $m^2 \cdot g^{-1}$ as measured by nitrogen adsorption-desorption analysis.

7. The method of claim 1, wherein the mesoporous chitosan/$NaFeSi_2O_6$ nanocomposite has a total pore volume of greater than 0.05 $cm^3 \cdot g^{-1}$ as measured by nitrogen adsorption-desorption analysis.

8. The method of claim 7, wherein the mesoporous chitosan/$NaFeSi_2O_6$ nanocomposite has a total pore volume of greater than 0.07 $cm^3 \cdot g^{-1}$ as measured by nitrogen adsorption-desorption analysis.

9. The method of claim 8, wherein the mesoporous chitosan/$NaFeSi_2O_6$ nanocomposite has a total pore volume of greater than 0.09 $cm^3 \cdot g^{-1}$ as measured by nitrogen adsorption-desorption analysis.

10. The method of claim 1, wherein the mesoporous chitosan/$NaFeSi_2O_6$ nanocomposite exhibits a Type IV isotherm with an H3 hysteresis loop in a nitrogen adsorption-desorption isotherm as determined by nitrogen adsorption-desorption analysis.

11. A nanocomposite, the nanocomposite comprising:
chitosan; and
$NaFeSi_2O_6$,
  wherein the chitosan envelops and aggregates nanoparticles of the $NaFeSi_2O_6$ in the form of rods, and
  wherein the nanocomposite has a mean pore diameter of greater than 15 nm as measured by nitrogen adsorption-desorption analysis.

12. The nanocomposite of claim 11, wherein the nanocomposite has a mean pore diameter of greater than 25 nm as measured by nitrogen adsorption-desorption analysis.

13. The nanocomposite of claim 12, wherein the nanocomposite has a mean pore diameter of greater than 35 nm as measured by nitrogen adsorption-desorption analysis.

14. The nanocomposite of claim 11, wherein the nanocomposite has a BET surface area of greater than 5 $m^2 \cdot g^{-1}$ as measured by nitrogen adsorption-desorption analysis.

15. The nanocomposite of claim 14, wherein the nanocomposite has a BET surface area of greater than 7 $m^2 \cdot g^{-1}$ as measured by nitrogen adsorption-desorption analysis.

16. The nanocomposite of claim 15, wherein the nanocomposite has a BET surface area of greater than 9 $m^2 \cdot g^{-1}$ as measured by nitrogen adsorption-desorption analysis.

17. The nanocomposite of claim 11, wherein the nanocomposite has a total pore volume of greater than 0.05 $cm^3 \cdot g^{-1}$ as measured by nitrogen adsorption-desorption analysis.

18. The nanocomposite of claim 17, wherein the nanocomposite has a total pore volume of greater than 0.07 $cm^3 \cdot g^{-1}$ as measured by nitrogen adsorption-desorption analysis.

19. The nanocomposite of claim 18, wherein the nanocomposite has a total pore volume of greater than 0.09 $cm^3 \cdot g^{-1}$ as measured by nitrogen adsorption-desorption analysis.

20. The nanocomposite of claim 18, wherein the nanocomposite exhibits a Type IV isotherm with an H3 hysteresis loop in a nitrogen adsorption-desorption isotherm as determined by nitrogen adsorption-desorption analysis.

* * * * *